Figure 3:
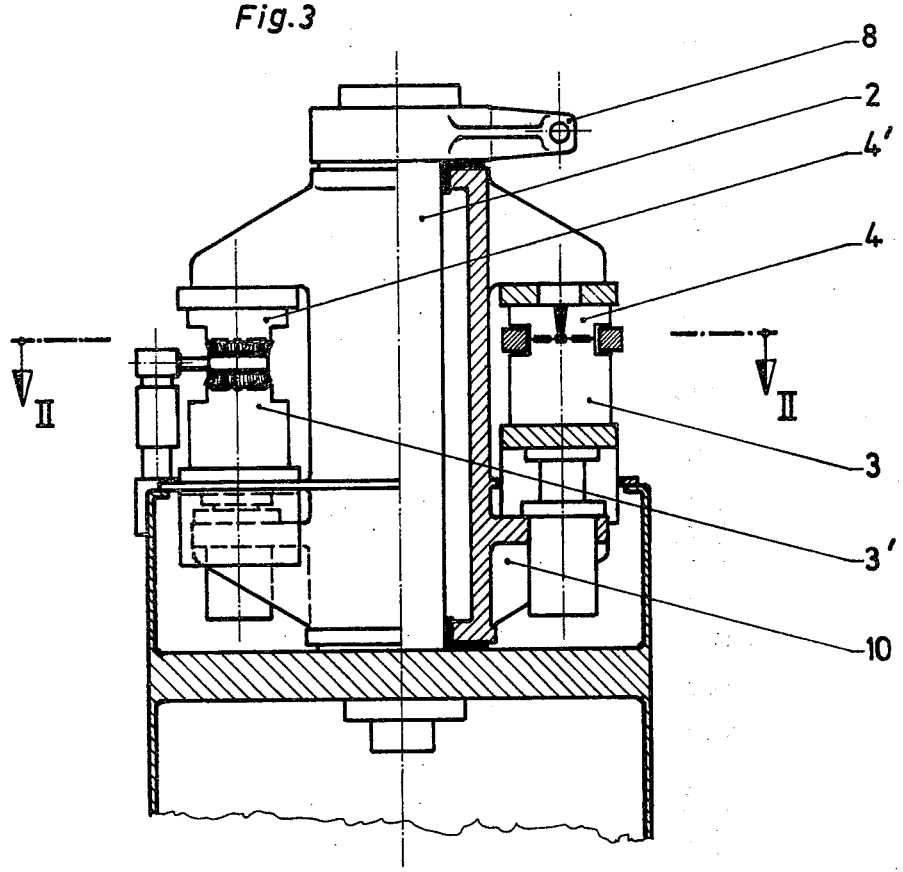

United States Patent
Plocher et al.

[11] 4,133,621
[45] Jan. 9, 1979

[54] APPARATUS FOR COVERING ELECTRONIC COMPONENTS WITH PLASTIC MATERIAL

[75] Inventors: Werner Plocher, Horb; Hans-Martin Lauffer, Hallwangen, both of Germany

[73] Assignee: Maschinenfabrik Lauffer & Butscher, Mühlen, Germany

[21] Appl. No.: 696,580

[22] Filed: Jun. 16, 1976

[51] Int. Cl.² .............................................. B29F 1/10
[52] U.S. Cl. ..................................... 425/116; 425/122; 425/126 R; 425/129 R; 425/229; 425/575; 425/453
[58] Field of Search ............... 425/116, 122, 123, 125, 425/126 R, 129, 226, 227, 229, 231, 451, 453, 454, DIG. 201, 576, 225, 218, 575, DIG. 116; 264/272, 39; 15/21 D

[56] References Cited

U.S. PATENT DOCUMENTS

| | | | |
|---|---|---|---|
| 3,571,920 | 3/1971 | Berg .................................. | 264/272 X |
| 3,577,610 | 5/1971 | Margolin et al. ................. | 425/231 X |
| 3,730,665 | 5/1973 | Fortin et al. ..................... | 425/576 X |
| 3,907,472 | 9/1975 | Lutsey .......................... | 425/126 R X |
| 3,918,864 | 11/1975 | Braun ............................... | 425/122 X |
| 3,973,888 | 8/1976 | Hehl ........................... | 425/126 R X |

FOREIGN PATENT DOCUMENTS

| | | | |
|---|---|---|---|
| 2114366 | 11/1972 | Fed. Rep. of Germany ...... | 425/126 R |
| 1311191 | 10/1962 | France ................................... | 425/246 |

*Primary Examiner*—Francis S. Husar
*Assistant Examiner*—Mark Rosenbaum

[57] ABSTRACT

A machine for covering electronic components with a low-pressure molding compound while said components are carried by a strip comprises a closing unit assembly, which is rotatable on an axis of rotation and comprises two angularly spaced apart, C-shaped closing sub units, each of which has an open side remote from said axis of rotation and comprises mold means and is operable to open and close said mold means. Each of said closing sub-units is operable to a first position, in which its mold means are adapted to enclose electronic components carried by a strip and to receive said molding compound to cover said components, and to a second position, in which its mold means are open. Said closing unit assembly is operable to move said closing sub-units in alternation to said first position and to move each closing sub-unit to said second position while moving the other closing sub-unit to said first position. The machine further comprises cleaning means operable to clean said mold means of each of said closing sub-units when the same is in said second position.

7 Claims, 3 Drawing Figures

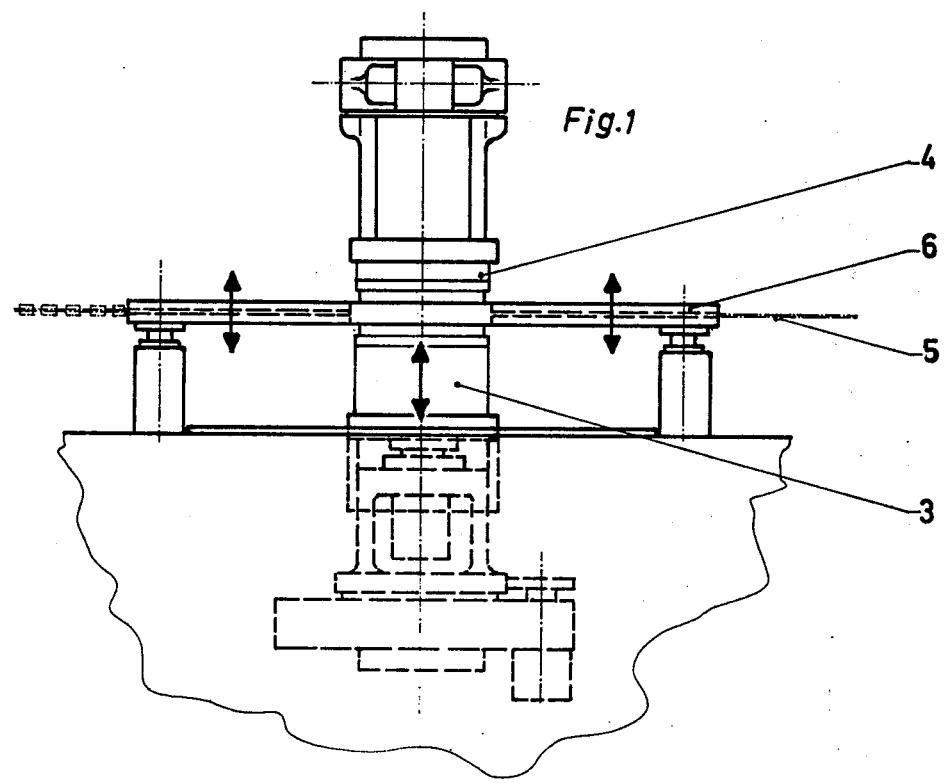
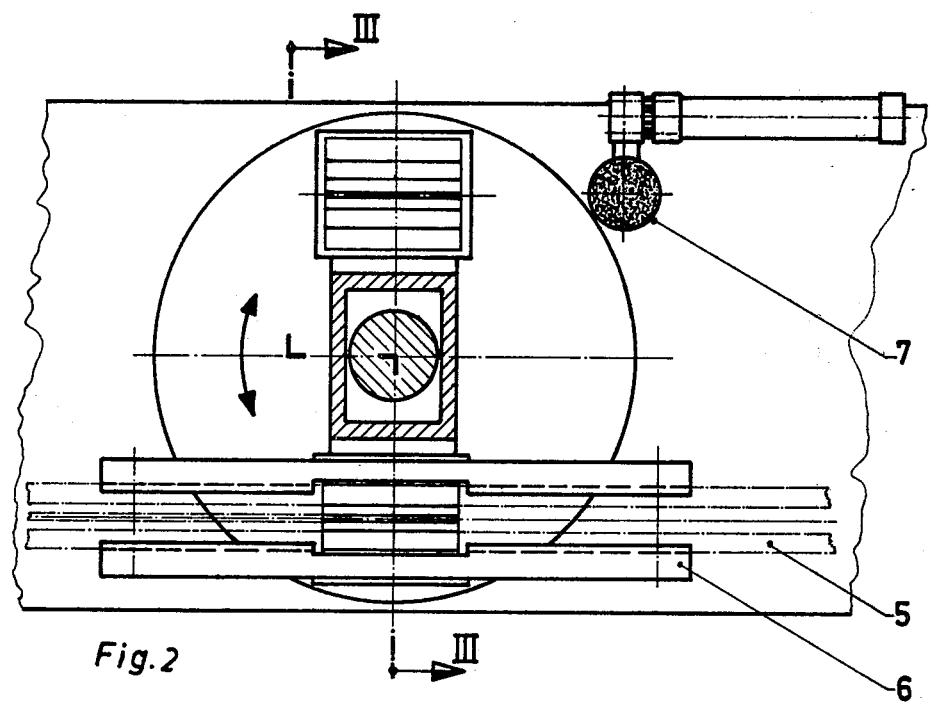

APPARATUS FOR COVERING ELECTRONIC COMPONENTS WITH PLASTIC MATERIAL

This invention relates to a machine for covering electronic components with plastics material.

Electronic components, such as diodes, transistors, integrated circuits, resistors etc. are covered with plastics material to protect the components against mechanical actions and various environmental conditions, such as moisture.

The plastics materials used to protect the components consist preferably of thermosettable low-pressure plastics material molding compounds, such as epoxy resins or silicone resins, and are processed mainly by transfer molding. Before these plastics materials have cured, they are liquids of low viscosity and capable of wetting metals.

The covering machines consist in most cases of four-column transfer molding presses for synthetic resins and each of these presses is provided with only one mold. For mass production it is conventional to use molds having a large number of mold cavities so that a plurality of components, e.g., 600 transistors, can be covered in one shot. A machine which comprises a turntable is also known.

The components can be economically manufactured on a carrier strip so that the components need not be individually transferred from one stage of the manufacturing process to the next following stage and each component can be economically processed in each stage. It is usual to handle the components on strip sections of finite length, which may carry components in a number that depends on the dimensions of each component, e.g., 50 transistors. These strip sections are severed from a virtually endless metal strip, which is provided with the components and has a length of 40 to 50 meters.

Depending on the design of the mold and the nature of the components, the components on a plurality of strip sections, e.g., 12 strip sections, are covered at the same time. Because it is not desired to place these strip sections into the mold individually, the strip sections are placed into a holding frame outside the press before they are covered.

When carrier strip sections provided with uncovered components have been placed into the holding frame, the latter is placed into the open mold by the operator. The mold is then closed, and the molding compound is fed into the transfer chamber and subsequently forced into the mold. When the shot has been completed and the molding compound has cured, the mold is automatically opened and the operator removes the holding frame with the covered elements from the mold. After the removal of the holding frame from the mold, the latter must be thoroughly cleaned by the operator because, as has been mentioned, the low-pressure molding compounds used as covering material are capable of wetting the metal of the transfer molds. Only when the mold has been cleaned can a second holding frame provided with uncovered components be placed into the hold. This second holding frame has been provided with the components during the preceding molding and curing operation.

In this practice, the time required to clean the mold and the time required to place the holding frame into the mold and to remove the holding frame from the mold add to the total covering cycle time. In the operation of the above machine comprising a turntable, the total cycle time is even much longer, for certain reasons, than with other conventional machines.

The components could be placed into the mold and removed therefrom much more economically if the components were still on the endless strip rather than on the strip sections severed therefrom and if this endless strip could be advanced through the mold between successive covering cycles.

On the other hand, a covering of components which are carried by endless strips would have benefits only if the mold could be automatically cleaned because the saving in covering cycle time would otherwise be much less significant in view of the non-productive time required for the manual cleaning.

If the conventional machines were used to cover components carried by endless strips, it would not be possible to provide for an economical automatic cleaning because the basic design of these machines is such that the endless strip obstructs the free access to the mold to be cleaned and because even if this problem could be solved the cleaning would still require non-productive time in which additional components cannot be covered.

For this reason it is an object of the invention to provide a machine which enables a covering of components carried by an endless strip and a cleaning of the mold during the molding and curing operation so that the cleaning time does not add to the total covering cycle time and there is almost no need for manual work at all.

To accomplish this object, in an assembly of closing units, a rotatable closing unit comprising two C-shaped closing sub-units is employed. Such closing unit assemblies are known from the above-mentioned turntable machine.

The invention is characterized in providing the closing unit with two closing sub-units, which are open on the side which is remote from the axis of rotation and which are cyclically operable in phase opposition to cause each closing sub-unit to enclose a strip portion which carries components to be covered and to render the other closing sub-unit accessible to cleaning means at the same time.

Each closing sub-unit comprises a covering mold, which has one or more mold cavities. The two molds of the two closing sub-units are identical and are preferably angularly spaced 180° apart. To cover components carried by an endless strip, the latter is advanced between successive covering cycles and the two molds receive the strip in alternation whereas that mold which belongs to the other closing sub-unit and does not contain the strip is cleaned at the same time. This technology may also be used to cover components carried by strip sections; in that case too the cleaning time does not add to the total cycle time.

The endless strip is suitably confined at its edge portions by tracks, which are movable parallel to the axis of rotation of the closing unit assembly, just as the molds of the closing sub-units as they open and close. The closing unit assembly is rotatable on an axis, which is preferably defined by a fixed axle.

During the transfer molding and curing operation performed in one mold, a steel brush is used to clean the mold which belongs to the other closing sub-unit and at that time does not contain a strip.

The axis of rotation of the closing unit assembly is preferably vertical but may alternatively be horizontal.

A preferred embodiment of a machine according to the invention is shown diagrammatically and by way of example, partly in section, on the drawing, in which FIG. 1 is an elevation showing the machine with an open mold, FIG. 2 is a sectional view taken on line II—II in FIG. 3 and FIG. 3 is a sectional view taken on line III—III in FIG. 2 and shows an open mold and closed mold.

The drawing shows a closing unit assembly 10, which is rotatable on a fixed axle 2 and comprises two identical molds 3, 4 and 3', 4'. The means for transferring the molding compound are carried by a stationary holder 8. When the closing unit assembly 10 is in the position shown in FIG. 1, the mold section 3 can be lifted and lowered. An endless strip 5, which carries the components to be covered, extends over the mold section 3 and is confined at its edge portions by vertically movable tracks 6.

The machine has the following mode of operation. When the closing unit assembly is in the position shown in FIG. 1, the mold 3, 4 is closed in that the mold section 3 and the tracks 6 are raised at the same time and carry the strip 5 along. The closed mold 3, 4 is shown on the right in FIG. 3.

While the molding compound is transferred through the mold section 4 and covers the components carried by the strip 5 and enclosed by the mold 3, 4 and the molding compound is subsequently allowed to cure, a machine-driven brush 7 cleans the mold sections 3', 4' of the other mold, which is then open (on the left in FIG. 3). When the molding compound has cured, the mold section 3 descends together with the tracks 6 and the latter subsequently lift the strip 5 carrying the covered components from the mold section 3. The strip 5 is then advanced by one increment whereas the closing unit assembly 10 rotates through 180° so that the mold section 3' is then disposed under the strip 5. The closing sub-unit comprising the mold sections 3', 4' is then used to perform a transfer molding cycle, as has been described hereinbefore, while the closing sub-unit which comprises the mold sections 3, 4 is cleaned.

What is claimed is:

1. Apparatus for covering electronic components with a low-pressure molding compound, comprising an assembly of closing units
    each of said closing units being rotatable on an axis of rotation and comprises two angularly spaced apart closing sub-units, each closing sub-unit has an open side remote from said axis of rotation and includes mold means located in said open side, said closing sub-units being operable to open and close said mold means, means operatively associated with each of said such closing units for carrying such components to and from each of said closing units,
    each of said closing sub-units being movable to a first position, in which its mold means are operable to enclose electronic components carried by said carrying means, and to receive such a molding compound to cover said components, and to a second position in which its mold means are open, and
    means operatively associated with each of said closing units for cleaning said mold means of each of said closing sub-units when the same is in said second position,
    said closing units being operable to move said closing sub-units in alternation to said first position, and to move one of two angularly spaced closing sub-units to said second position while moving the other closing sub-unit to said first position, so that said closing unit is operable for continuous covering of said components, while at the same time being automatically cleaned.

2. Apparatus as set forth in claim 1, in which
    said carrying means is an endless strip and each of said mold means is operable to enclose electronic components carried by a finite length portion of said strip when the closing sub-unit comprising said mold means is in said first position, and
    said closing sub-units are operable to open each of said mold means after said components enclosed thereby have been covered with such a molding compound.

3. Apparatus as set forth in claim 2, in which
    track means are provided adjacent said closing sub-units, which are operable to confine said strip at opposite edge portions thereof,
    said mold means are operable to be opened and closed by a movement which is parallel to said axis of rotation, and
    said track means are movable relative to said mold means parallel to said axis of rotation, and are operable to advance said strip by a length increment which is equal to the length of said length portion.

4. Apparatus as set forth in claim 1, in which said axis of rotation is vertical to the direction of movement of said carrying means.

5. Apparatus as set forth in claim 1, in which said closing unit is rotatably mounted on a fixed axle.

6. Apparatus as set forth in claim 1, in which said cleaning means comprises a brush.

7. Apparatus as set forth in claim 1, in which
    said closing sub-units are angularly spaced 180° apart, and
    each of said closing sub-units is angularly movable 180° from said first position to said second position and also from said second position to said first position.

* * * * *